US009451237B2

(12) United States Patent
Schick et al.

(10) Patent No.: US 9,451,237 B2
(45) Date of Patent: Sep. 20, 2016

(54) REMOTE CONTROL DEVICE FOR CONTROLLING A MECHANISM WITH THE AID OF A MOVABLE OBJECT AND AN INTERFACE MODULE BASED ON MOVEMENT AND DISTANCE OF THE MOVABLE OBJECT WITH RESPECT TO A CAMERA

(75) Inventors: Friedrich Schick, Karlsruhe (DE); Jens Schick, Herrenberg (DE)

(73) Assignee: MYESTRO INTERACTIVE GMBH, Ulm (DE)

( * ) Notice: Subject to any disclaimer, the term of this patent is extended or adjusted under 35 U.S.C. 154(b) by 404 days.

(21) Appl. No.: 13/979,535

(22) PCT Filed: Dec. 23, 2011

(86) PCT No.: PCT/EP2011/073990
§ 371 (c)(1),
(2), (4) Date: Jul. 12, 2013

(87) PCT Pub. No.: WO2012/095258
PCT Pub. Date: Jul. 19, 2012

(65) Prior Publication Data
US 2013/0293685 A1    Nov. 7, 2013

(30) Foreign Application Priority Data
Jan. 12, 2011   (DE) .................. 10 2011 002 577

(51) Int. Cl.
*H04N 15/00* (2006.01)
*H04N 13/02* (2006.01)
(Continued)

(52) U.S. Cl.
CPC .......... *H04N 13/0203* (2013.01); *G06F 3/017* (2013.01); *G06F 3/0304* (2013.01); *H04N 21/42222* (2013.01)

(58) Field of Classification Search
USPC ........................................... 348/48
See application file for complete search history.

(56) References Cited

U.S. PATENT DOCUMENTS

| 5,530,420 A | 6/1996 | Tsuchiya |
| 6,204,852 B1 | 3/2001 | Kumar et al. |

(Continued)

FOREIGN PATENT DOCUMENTS

| DE | 4446452 B4 | 11/2006 |
| DE | 102009012758 A1 | 9/2010 |

(Continued)

OTHER PUBLICATIONS

Office Action, dated Jul. 24, 2015. In corresponding application No. 2013-548 774.

*Primary Examiner* — Leron Beck
(74) *Attorney, Agent, or Firm* — Browdy and Neimark, PLLC

(57) ABSTRACT

A remote control device is used to control a mechanism with the aid of a movement pattern and/or a distance pattern of at least one moved object. The remote control device has a camera module to receive a stereo image and to detect the moved object. An image evaluation module has a movement evaluation sub-module and a distance evaluation sub-module. A control and communication module of the remote control device, depending on the movement or distance values determined, generates at least one mechanism control signal and sends it to the mechanism to be controlled. An interface module has a data memory, a comparator sub-module and a communication sub-module. The latter, with adequate agreement between the respective actual parameter and one of the desired movement parameters, sends the control signal assigned in the table to the module of the remote control device or to the mechanism.

14 Claims, 2 Drawing Sheets

(51) Int. Cl.
*G06F 3/01* (2006.01)
*G06F 3/03* (2006.01)
*H04N 21/422* (2011.01)

(56) References Cited

U.S. PATENT DOCUMENTS

| | | |
|---|---|---|
| 7,886,229 B2 | 2/2011 | Pachet |
| 8,432,390 B2 * | 4/2013 | Givon .................. 345/419 |
| 2008/0059578 A1 | 3/2008 | Albertson |
| 2008/0273755 A1 | 11/2008 | Hildreth |
| 2010/0060722 A1 | 3/2010 | Bell |
| 2010/0199228 A1 * | 8/2010 | Latta et al. .............. 715/863 |
| 2010/0325590 A1 | 12/2010 | Homma et al. |
| 2011/0149045 A1 | 6/2011 | Wuerz-Wessel |

FOREIGN PATENT DOCUMENTS

| | | |
|---|---|---|
| EP | 1376051 B1 | 1/2004 |
| EP | 1645944 A1 | 4/2006 |
| JP | 2000331170 A | 11/2000 |
| JP | 2003316510 A | 11/2003 |
| JP | 2004187125 A | 7/2004 |
| JP | 2006209563 A | 8/2006 |
| JP | 2011003136 A | 1/2011 |
| JP | 2007264832 A | 10/2011 |
| WO | 0371410 A2 | 8/2008 |
| WO | 2009133095 A1 | 11/2009 |
| WO | 2010103061 A1 | 9/2010 |

* cited by examiner

REMOTE CONTROL DEVICE FOR CONTROLLING A MECHANISM WITH THE AID OF A MOVABLE OBJECT AND AN INTERFACE MODULE BASED ON MOVEMENT AND DISTANCE OF THE MOVABLE OBJECT WITH RESPECT TO A CAMERA

CROSS-REFERENCES TO RELATED APPLICATIONS

This application claims the priority of German Patent Application, Serial No. 10 2011 002 577.4, filed Jan. 12, 2011, pursuant to 35 U.S.C. 119(a)-(d), the content of which is incorporated herein by reference in its entirety as if fully set forth herein.

FIELD OF THE INVENTION

The invention relates to a remote control device for controlling a mechanism to be controlled with the aid of a movement pattern and/or a distance pattern of at least one moved object. Furthermore, the invention relates to an interface module for communication between the modules of a remote control device of this type or between at least one of the modules of the remote control device and an external mechanism.

BACKGROUND OF THE INVENTION

Remote control devices are known from US 2010/0199228 A1 and WO 2008/058 783 A1. A remote control device for controlling an external mechanism to be controlled, for example an air conditioning system or a television set, with the aid of arm pointing gestures by a person is known from US 2006/0168523 A1. EP 1 637 985 A2 describes a device input controller.

SUMMARY OF THE INVENTION

An object of the present invention is to develop a remote control device of the type mentioned at the outset in such a way that a control of the mechanism with the aid of the moved object is made possible, in particular even in unfavorable environmental conditions.

This object is achieved according to the invention by a remote control device for controlling a mechanism to be controlled with the aid of a movement pattern and/or a distance pattern of at least one moved object,
 with a camera module to receive a stereo image and to detect the moved object;
 with an image evaluation module, which has a signal connection to the camera module;
  with a movement evaluation sub-module, which determines movement values with respect to the detected object from detected camera signal data;
  with a distance evaluation sub-module, which determines distance values with respect to the detected object from the detected camera signal data,
 with a control and communication module, which has a signal connection to the image evaluation module and, depending on the determined movement values and/or depending on the determined distance values, generates at least one mechanism control signal and sends it to the mechanism to be controlled.

The camera module may have at least two cameras to receive the stereo image. The cameras of the camera module may be designed as a webcam. The cameras of the camera module can detect colors. The cameras of the camera module can work asynchronously. A spatial assignment of the cameras with respect to one another is not critical. A single camera unit generating two or more images is also possible, for example a sensor with a splitting optical system. A camera unit of this type may have a plurality of optical systems or else a mirror optical system to measure a spatial image dimension. The moved object may be a body part of a user. The remote control device can then be used for a gesture control, in which the image evaluation module derives movement patterns and/or distance patterns from the detected movement and distance values, said movement patterns and/or distance patterns being assigned to control gestures, which are in turn assigned a mechanism control signal. In the framework of the gesture control, the remote control device can detect movements of the fingers, the fist, the limbs, the head, the facial expressions, the trunk and in general of body parts of the user. In particular, a pointing or rotation of body parts, linear movements in the various spatial directions, or a combination of these movements, which can also be carried out simultaneously by a plurality of body parts, can be detected. The movement values may be the speed and the acceleration and higher derivations of a measured position change of the moved object. The image evaluation by the remote control device according to the invention does not assume any movement models, distance models or design models. The image evaluation can take place exclusively with the aid of the movement, in other words the flow, and the distance of the moved object. Movement or distance patterns emerging from the movement values or distance values are characterized in the image evaluation module with the aid of a statistical movement strategy. In this case, a Kalman filter may additionally be used. This characterization can take place in the image evaluation module. Physiologically "impossible" gestures can be ruled out by this, for example. The characterization of the movement or distance patterns can take place by means of the time accumulation of certain movement, speed or distance values of point clouds detected by the camera module or of identified grid points. A movement pattern can be obtained by the time tracking of the object, for example by determining a movement direction, a direction change, persistence in the movement, in other words, for example, a pause in the gestures, a movement sequence, a movement speed or a combination of these movement values. A distance pattern can be obtained accordingly. The image evaluation may contain a teach-in process, i.e. a stabilization of an assignment of detected movement values and/or distance values by a spatial and/or time movement module adapted during detection in the course of time. A teach-in process of this type is, however, not a prerequisite for the functioning of the remote control device but is a possibility for a functional stabilization. A detected object can be identified by an adequate measure of agreement of movement parameters or distance parameters, which are obtained from the evaluation of the movement or distance patterns and are also called signatures. These movement or distance parameters are generated in the image evaluation module by evaluating the individual images detected by the camera module. A distance evaluation, in other words a determination of distance values from the camera signal data, can take place by triangulation. The evaluation of the movement and the distance of the object with the image evaluation module does not imperatively have to take place in real time. It is sufficient if the evaluation takes place promptly. A time delay between detecting an object movement and the evaluation may be up to 200 ms.

The remote control device can be configured as an input device for controlling a computer. For example, a navigation in the internet can take place, or browser games can be played by means of the remote control device. The remote control device can replace conventional remote controls in the household, for example for television sets, video devices or DVD players, stereo systems or home control systems, for example to control dimming, lighting or heating or computers. The remote control device or components or modules of the remote control device may be integrated in the mechanism to be controlled. The mechanism to be controlled may, in particular, be a television set with an additional computer function, in particular an internet enabled television set, which, for example, has additional interfaces such as USB and WLAN and may have additional memory cards and a network functionality. The television set may, in particular, be a hybrid broadcast broadband TV. A television set of this type, in which the remote control device to control the television set is integrated as a whole or component-wise or module-wise, is an independent aspect of the invention. The remote control device may be a component of a system environment for using augmented reality. In this case, the remote control device can be linked to a system control environment by means of a corresponding interface. As the remote control device can work independently of models, in other words independently of preprocessed camera signal data, it is unimportant, for example, if the moved object in the detection region of the camera module is partially concealed by static items, for example by a bouquet of flowers, between the cameras of the camera module and the user.

A camera module with at least three cameras allows an increased distance resolution in an extended distance range. In addition, at least three cameras can allow an evaluation of object regions, which are concealed, for example, by stationary third objects when using a camera module with a smaller number of cameras. The cameras may be arranged next to one another in a row in the camera module.

An image evaluation module comprised by the image evaluation module, having a brightness evaluation sub-module, which determines contrast values and/or color values with respect to the detected object from the detected camera signal data, may be configured in such a way that a change of contrast values or a change in color values can be detected. A detection of spatial or time changes of these contrast or color values is possible. The detected contrast or color values may also be used to determine movement or distance values.

A detail preselection sub-module comprised by the image evaluation module, which, from detected raw camera signal data, selects and preselects an image detail of an image region, which can be detected as a whole by the camera module, the camera signal data of which are subjected to a further evaluation, increases the precision of the image detection. A more intensive calculation of the signal data can take place in the selected image detail. A plurality of mechanisms to be controlled can be operated simultaneously. A plurality of image details can also be preselected for a plurality of operators to operate one and the same mechanism to be controlled. In this case, the remote control device contains an additional priority control, by means of which it can be preselected which of the operators or users has priority relative to the other operator(s) or user(s) or whether one of the operators can replace the other operator(s). A dynamic adaptation of the preselected image detail is possible. The image detail data, in other words a height and/or a width and/or a depth of the image detail, which may be an area or a volume element, may be stored in a data memory of the image evaluation module. A horizontal direction, which is assigned to the width of the image detail, can be preselected by means of a position of the mechanism to be controlled or by means of a position of the camera module, in particular by means of a position of the at least two cameras with respect to one another. A time-out sub-module, by means of which a preselected image detail is deleted again after a preselected inactivity timespan, for example after the expiry of several seconds, can cooperate with the detail preselection sub-module, so, subsequently, a detection takes place again over the entire detectable image or a new image detail can be preselected. The detail preselection sub-module can cooperate with a deactivation sub-module, by means of which a preselected image detail is deleted again after the recognition of a deactivation signature. A volume, which can be detected by the camera module, in the object space can be divided into various zones, in which object movements are evaluated differently by the image evaluation module.

An image error evaluation sub-module comprised by the image evaluation module, which, from the detected camera signal data, determines imaging errors, can detect intrinsic image errors of the camera module or can detect intrinsic errors that were produced or are produced during operation of the remote control device. This can be used to correct the image evaluation in the image evaluation module.

A texture evaluation sub-module comprised by the image evaluation module, which determines textures from the detected camera signal data, extends the possibilities of the remote control device. Textures are further, detailed object data, which go beyond an abstract object characterization with the aid of the movement and the distance, for example less object grid points. The grid point characterization can take place by means of polygons. Both the grid point data and the texture data, in other words all the signal data that can be evaluated by the image evaluation module, can be generated by one and the same camera module and, in particular, by one and the same camera.

An activation evaluation sub-module comprised by the image evaluation module, having an activation evaluation sub-module with a data memory, which, from the detected camera signal data, determines an object signature and compares it with an activation signature stored in the data memory, wherein, with adequate agreement of the determined object signature with the activation signature, an activation signal is sent to the control and communication module to activate the mechanism to be controlled, can evaluate an activation signature, for example a pointing gesture of the user to the mechanism to be controlled or the camera module. Alternatively, an activation of the mechanism to be controlled can also be started by means of a movement sensor, for example by means of an infrared movement sensor, which is then also a component of the remote control device. The detection and the evaluation of a confirmation signature of the moved object can be made the prerequisite of an activation of the mechanism to be controlled. The activation evaluation sub-module can be designed in such a way that an activation signal to the mechanism to be controlled is only sent after an evaluation and validation of the confirmation signature by the image evaluation module.

A feedback module, which has a signal connection to the control and communication module to display a feedback signal of the mechanism to be controlled and/or of the moved object to the remote control device, can be designed as a display, as one or more light sources, for example one or more LEDs, as an audio feedback, as a cursor or as another marking on a screen, for example as an emphasizing of a screen detail by a zoom function or a virtual curvature. A feedback signal of the mechanism to be controlled shows the user to what extent the mechanism is working as desired, for example whether a previous control signal was interpreted correctly. A display of a feedback signal of the moved object shows the user to what extent his gestures are detected in the desired manner by the remote control device.

A camera activation module, which has a signal connection to the camera module and the control and communication module, the control and communication module, depending on the determined movement values and/or depending on the determined distance values, generating at least one camera control signal and sending it to the camera module, can additionally have a signal connection to the image evaluation module. The camera activation module can bring about a sensitivity control and a focus control of the camera module, so that, for example, a moved object is also focused and the latter is detected with appropriate sensitivity.

An input module, which can be actuated with the aid of the movement pattern and/or the distance pattern of the moved object and has a signal connection to the control and communication module to input mechanism control signals by means of a movement of the object, can be designed as a mouse on a display, as a spatial pointer or as a keyboard on a display. An input on the input module can take place, in particular, by finger gestures. As a result, a game controller can be realized on a display. The input module can be designed as a "virtual" installed module. A device for realizing a module of this type is known under the trade name "Airscouter™". The camera module can also be integrated in a user-side component which has an input module of this type. The input module can also be installed in glasses of the user, as is known in motor vehicles in a windscreen. The input module can be shown on a virtual plane. The impression can be given to the user that the input plane is hovering in front of him in space. Various input planes of this type can also be provided as the input module and selected by choice, these being configured, for example, as keyboards stacked in the manner of organ keyboards.

An illumination module to illuminate a detection region, in which the moved object can be detected by the camera module, may have a light source in the form of, for example, an LED. A brightness adjustment can take place by means of a sensor-controlled feedback. The illumination module may have a brightness sensor. The brightness sensor may be designed as a photodiode. A contrast variation and/or a contrast displacement can be brought about by means of an illumination of the illumination module.

A multi-color light source, in which the illumination module has a light source with a plurality of emitted colors, can be configured as an RGB light source or as a VIS/NIR/MIR light source with two, three, four or more colors. The light source of the illumination module can be designed as a daylight source.

Raw signatures, comprising a raw signature memory module, in which movement parameter sets of assigned movement values and/or distance values and control signals assigned to these sets are stored in a table,
with a comparator module, in which actual movement parameters, which are detected with the camera module and the image evaluation module (8), are compared with desired movement parameters from the stored raw signature memory module,
wherein the control and communication module, with adequate agreement between the actual movement parameter and one of the desired movement parameters, sends the assigned control signal to the mechanism to be controlled,
may correspond to individual preselected operator gestures. The raw signatures may be stored in the raw signature memory module with all the degrees of freedom of rotation and translation and in various scaling.

A further object of the invention is to develop an interface module of the type mentioned at the outset in such a way that object movements can thereby be reliably converted into control signals.

This object is achieved according to the invention by an interface module for communication between the modules of a remote control device according to the invention or between at least one of the modules of the remote control device and an external mechanism,
with a data memory, in which
movement parameter sets of assigned movement values and/or distance values and
control signals assigned to these sets
are stored in a table,
with a comparator sub-module, in which actual movement parameters, which are fed to the interface module, are compared with desired movement parameters from the movement parameter sets stored in the data memory,
with a communication sub-module, which, with adequate agreement between the respective actual movement parameter and one of the desired movement parameters sends the control signal assigned in the table to the module of the remote control device or to the external mechanism.

An interface module of this type can universally convert object movements into control signals. The interface module may be part of a computer implementation of a browser. The comparator sub-module of the interface module can carry out a statistical evaluation analogously to that which was stated above with regard to the image evaluation module of the remote control device.

Embodiments of the invention will be described in more detail below with the aid of the drawings.

DESCRIPTION OF THE PREFERRED EMBODIMENTS

A remote control device 1 is used to control a mechanism 2 to be controlled with the aid of a movement pattern and/or a distance pattern of at least one object 3. The mechanism to be controlled may be a mechanism from entertainment electronics, for example a television set or a stereo system. The mechanism 2 to be controlled may be a computer or another data processing mechanism. The remote control device 1 may be integrated in the mechanism 2 to be controlled.

The moved object 3 is the user of the remote control device 1. The moved objects are the finger(s), the hand, the fist, one or both arms, the head, the trunk or other limbs of the user. The moved object 3 may also be an object guided by the user, for example a pointing device in the form of a pointer or another pointing implement.

Figure 1:
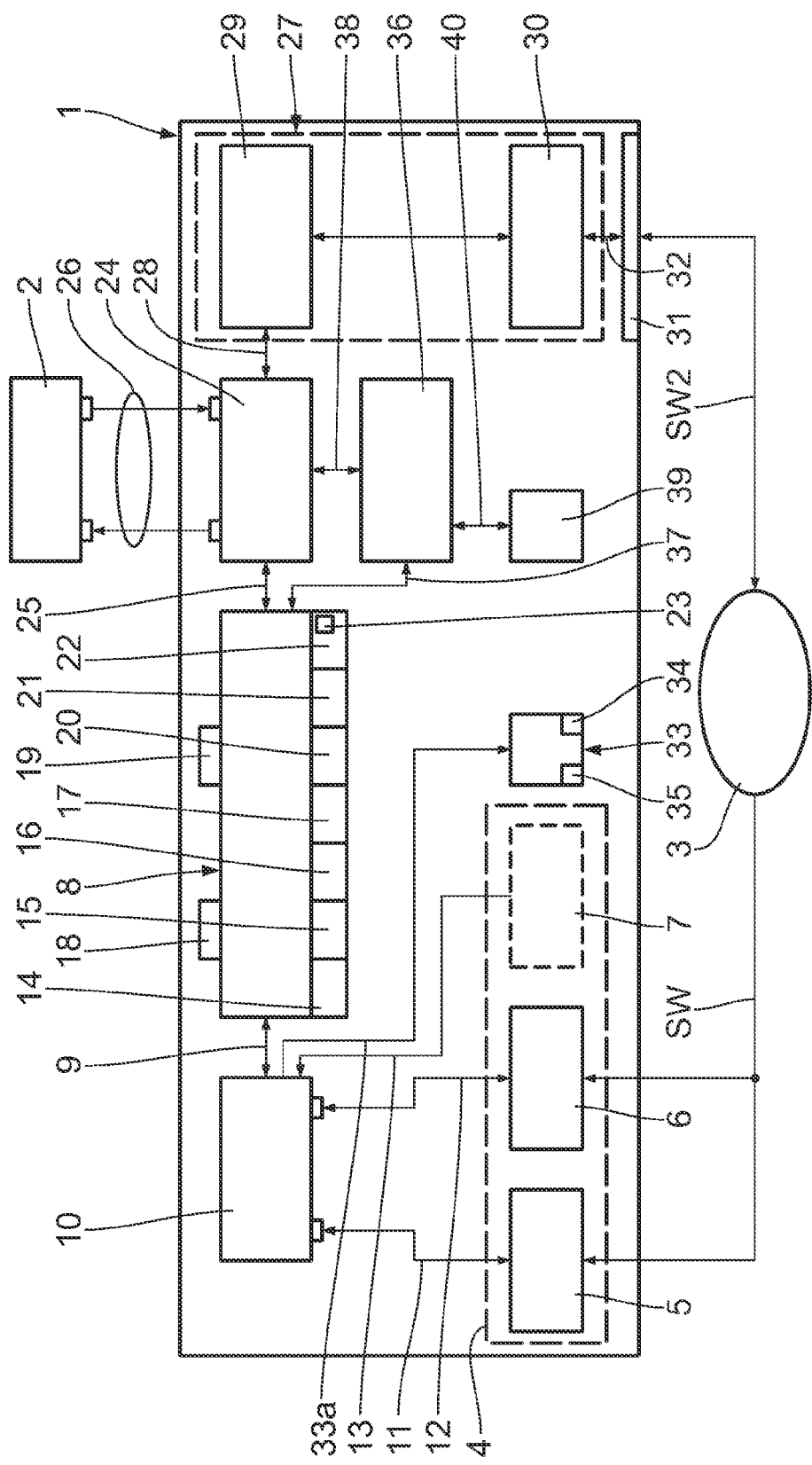
FIG. 1 shows a schematic block view of a remote control device to control a mechanism to be controlled with the aid of a movement pattern and/or a distance pattern of at least one moved object.

The remote control device 1 has a camera module 4 with two cameras 5, 6 to receive a stereo image and to detect the moved object 3. This signal detection is shown in FIG. 1 by a signal path SW. In an alternative configuration, the camera module 4 may also have three cameras. A third camera 7 of the camera module 4 is shown by dashed lines in FIG. 1. The cameras 5 to 7 can be configured as webcams. The cameras 5, 6 or 5 to 7 of the camera module 4 can detect and distinguish various colors. In a further variant, the camera module 4 may have a single camera unit, which generates two or more images. A camera unit of this type, to measure a spatial image dimension, in other words to detect a spatial depth, may have a plurality of optical systems or else a mirror optical system. An example of a camera unit of this type is the product Loreo™ 3D Lens in a Cap™, which is described on the internet page www.loreo.com. The camera module may be arranged statically in a space, in which the user is located, but may alternatively also be carried by the user himself.

The remote control device 1 furthermore has an image evaluation module 8, which has a signal connection by means of a signal connection 9 to a camera activation module 10 and, by means of a further signal connection with signal lines 11, 12, to the cameras 5, 6 of the camera module 4. A corresponding signal line 13 connects the optional third camera 7 to the camera activation module 10, so a signal connection is also provided between the image evaluation module 8 and the optional third camera 7.

The image evaluation module 8 has a movement evaluation sub-module 14, which determines movement values with respect to the detected object 3 from detected camera signal data. The movement values are the speed and the acceleration of the object 3.

The image evaluation module 8 furthermore has a distance evaluation sub-module 15, which determines distance values with respect to the detected object 3 from the detected camera signal data. The distance values are determined, for example, by a comparison of the extent of detected object structures with the extent of static objects with a known size in the detected object field or by comparative evaluation with the camera signal data of the various cameras 5, 6 or 5 to 7. If the three cameras 5 to 7 are used, a more precise determination of the position of object structures is possible on the basis of the additional camera information. A measurement of object structures is then possible, which is, for example, visible with the third camera 7 and one of the two cameras 5, 6, but not with the other camera 6, 5.

The movement values and the distance values with respect to the detected object 3 are determined by evaluating consecutive images of the camera module 4 by a comparison of the positions of identified object structures.

The image evaluation module 8, from the detected movement and distance values, produces movement and distance patterns, which are characterized with the aid of a statistical evaluation strategy. This can take place by means of the time accumulation of movement values of point clouds detected by the camera module 4. The movement pattern can be obtained from the movement values by time tracking of the object. The same applies to the distance pattern. The object 3 or relevant parts thereof, is identified by an adequate measure of agreement of movement parameters, so-called signatures, which are generated by the evaluation of individual images detected by the camera module by means of the image evaluation module 8. Distance values may be determined by triangulation.

A digital filter, for example a Kalman filter, may be used during the evaluation of the camera signal data.

The image evaluation module 8 furthermore contains a brightness evaluation sub-module 16. From the detected camera signal data, the latter determines contrast values and/or color values with respect to the detected, moved object 3. The image evaluation module 8 is configured in such a way that a change of the contrast or color values determined by the brightness evaluation sub-module 16 can be calculated. By means of the brightness evaluation sub-module 16, it is possible to detect spatial or time changes of the contrast or color values by the image evaluation module 8. The determined contrast or color values can also be used to determine the movement and the distance values.

The image evaluation module 8 furthermore has a detail preselection sub-module 17. This selects a detail of the image or detection region that can be detected as a whole by the camera module 4 from detected raw camera signal data and preselects this selected detail as an image detail, the camera signal data from this image detail then being subjected to a further evaluation. By means of the detail preselection sub-module 17, the selection and preselection of a plurality of image details is also possible, said image details being able to be arranged separately from one another in the detectable overall detail or else overlapping one another in the detectable overall detail of the camera module 4. In the case where a plurality of image details are preselected, the image evaluation module 8 preselects a priority assignment, in other words ensures that mutually contradicting object movements in the various preselected image details do not lead to an undesired functioning of the mechanism 2 to be controlled. A volume that can be detected overall by the camera module 4 can also be divided into various volume zones by means of the detail preselection sub-module 17.

The image evaluation module 8 furthermore has a data memory 18, in which image detail data, for example relating to the height, the width and the depth of an image detail in terms of area or volume selected by the detail preselection sub-module 17, are stored. A horizontal direction for definition of the height, width and depth dimension can be preselected by means of a position of the mechanism 2 to be controlled or by means of a position of the at least two cameras 5, 6 or 5 to 7 of the camera module 4 with respect to one another.

The image evaluation module 8 furthermore has a deactivation sub-module or time-out sub-module 19. The latter contains a counter or a clock, so an image detail preselected by means of the detail preselection sub-module 17 is deleted again after a predetermined inactivity timespan, in which no movement of the object 3 is detected.

An image detail preselected by the detail preselection sub-module 17 can be deleted again by means of the deactivation sub-module 19 after the recognition of a deactivation signature, in other words a corresponding movement sequence or gestures of the object 3.

The image evaluation module 8 furthermore has an image error evaluation sub-module 20. From the detected camera signal data, the latter determines imaging errors, for example intrinsic imaging errors or imaging errors of the type which are produced during operation by displacement or rotation of the cameras with respect to one another or have already been produced beforehand, in other words extrinsic imaging errors. At the evaluation of the camera signal data, the determined imaging errors can then be used for data correction.

The image evaluation module 8 furthermore has a texture evaluation sub-module 21. The latter determines textures from the detected camera signal data. For this purpose, further object data, the textures, are first of all assigned to an object abstractly characterized by means of movement values and distance values for example less grid points, for example by means of polygons. All the signal data evaluated by the image evaluation module 8, in other words both the grid point data and the texture data, can be generated by the same respective cameras 5, 6 or 5 to 7 of the camera module 4.

The image evaluation module 8 furthermore has an activation evaluation sub-module 22 with a data memory 23. The activation evaluation sub-module 22, from the detected camera signal data, as long as the mechanism 2 to be controlled is still running in stand-by operation, determines an object signature and compares it with an activation signature stored in the data memory 23. With adequate agreement of the determined object signature with the stored activation signature, the activation evaluation sub-module 22 sends an activation signal to activate the mechanism 2 to be controlled. The activation signature may be a pointing gesture to the mechanism 2 to be controlled or a pointing gesture to the camera module 4. Alternatively, an activation of the mechanism 2 to be controlled can also be started by means of a movement sensor, which may be configured as an infrared movement sensor. A movement sensor of this type is also a component of the remote control device 1 in this alternative configuration. A confirmation signature, which can be used to confirm an activation signature, may also be stored in the data memory 23 of the activation evaluation sub-module. In this case, an activation signal is only sent from the activation evaluation sub-module 22 when the recognized activation signature could be assigned a valid confirmation signature, in other words when the user also makes a confirmation gesture after an activation gesture.

The remote control device 1 furthermore has a control and communication module 24. The latter communicates with the image evaluation module 8 by means of a signal connection 25. The control and communication module 24, depending on the determined and evaluated movement values and/or depending on the determined and evaluated distance values, generates a mechanism control signal. The control and communication module 24 has a data connection to the mechanism 2 to be controlled by means of an interface 26.

The remote control device 1 furthermore has a feedback module 27. This communicates with the control and communication module 24 by means of a signal connection 28. The feedback module 27 is used to display a feedback signal of the mechanism 2 to be controlled to the remote control device 1. The feedback module 27 has a computer sub-module 29, which calculates a system feedback from the response data obtained from the mechanism 2 to be controlled. Furthermore, the feedback module 27 has a feedback device 30, which may be a display, one or more light sources, for example in the form of an LED, or a loudspeaker device for audio feedback. On the display, a marking can additionally specify the feedback which can be configured as a cursor or as another marking, for example by emphasizing a display detail by a lens function or by a virtual curvature.

A signal exchange between the object 3 and the feedback module 27 is shown in FIG. 1 by a further signal path SW2.

The remote control device 1 furthermore has an input module 31. This has a signal connection by means of the feedback module 27 to the control and communication module 24. The input module 31 communicates by means of a signal connection 32 with the feedback module 27 or the feedback device 30. The input module 31 is used for the user to input mechanism control signals. The input module 31 may be an interactive display with a spatial pointer, with a mouse or with a keyboard. The input module 31 may also be virtually installed in a visual field of the user. A corresponding product from the business Brother® is known by the name "Airscouter™". Embodiments which may be suitable for the input module 31 are described in US 2009/0002791 A1.

The input module 31 may provide various input planes, which can be activated by the user by choice by corresponding activation signatures. These various input levels with corresponding with corresponding input aids, for example in the form of keyboards, may be arranged spatially staggered in the manner of organ keyboards.

The remote control device 1 furthermore has an illumination module 33 to illuminate a detection region, in which the object 3 can be detected by the camera module 4. The illumination module 33 communicates with the camera activation module 10 by means of a signal connection 33a. The illumination module 33 comprises a light source 34, for example in the form of an LED. The illumination module 33 furthermore comprises a brightness sensor 35. The illumination module 33 brings about an adjustment of a brightness of the detectable object field or, if a communication takes place with the detail preselection sub-module 17, of the preselected image detail. The brightness adjustment take place by means of a fed-back activation of the light source 34 controlled by the brightness sensor 35. The brightness sensor 35 may be configured as a photodiode. The illumination module 33, by means of corresponding communication with the image evaluation module 8, can bring about a desired contrast variation or else contrast displacement by corresponding activation of the light source 34. The light source 34 may bring about an illumination with a plurality of colors. A light fraction with a wavelength focus is called a color here. The wavelengths of these focuses are significantly different from one another in different colors. The light source 34 may be an RGB light source, but also a light source which emits colors from the visible spectral range (VIS) and/or the near-infrared spectral range (NIR) and/or the middle infrared range (MIR). The light source can emit two, three, four or more colors. The light source 34 may be a daylight source.

The remote control device 1 furthermore has a raw signature memory module 36. Movement parameter sets or signature sets of assigned movement values and/or distance values and control signals assigned to these sets are stored therein in a table. The raw signature memory module 36 communicates by means of a signal connection 37 with the image evaluation module 8 and by means of a signal connection 38 with the control and communication module 24.

The remote control device 1 furthermore has a comparator module 39, which communicates with the raw signature memory module 36 by means of a signal connection 40. In the comparator module 39, actual movement parameters, which are detected by the camera module 4 and evaluated with the image evaluation module 8, are compared with desired parameters from the raw signature memory module 36. With adequate agreement between the actual movement parameters or the actual signatures and one of the desired movement parameters or a desired signature, the control and communication module 24 sends an assigned control signal by means of the interface 26 to the mechanism 2 to be controlled. The raw signatures, in other words the desired movement parameters or the desired signatures, may correspond to individual operator gestures. These raw signatures are stored in the raw signature memory module 36 with all the degrees of freedom of rotation and translation and in various size scaling.

A gesture control using the remote control device 1 takes place as follows: the user, in other words the moved object 3, positions himself in the detection range of the camera module 4 and first of all activates the mechanism 2 to be controlled by means of a movement or by means of an activation gesture, which is recognized by the activation sub-module 22. The user then uses gestures which have been practiced beforehand or are intuitive in order to control the mechanism 2. The movement values and the distance values of these gestures are detected by the camera module 4 and evaluated by the image evaluation module 8, as already described above. The camera activation module 10, apart from a control of the individual cameras 5, 6 or 5 to 7, also ensures a brightness compensation and, by communication with the detail preselection sub-module 17, can focus the cameras 5, 6 or 5 to 7 on at least one preselected image detail or optimize its illumination.

Apart from a direct gesture control, for example switching over a program in a television set or adjusting the volume or the image brightness, an interactive control is also possible by means of the feedback module 27. For this purpose, by means of his gestures, the user can control an input aid, which is provided by the feedback module 27 or by the input module 31, with his gestures, for example, by corresponding finger pointing, select letters, which are given on a keyboard installed in front of him in the space or on a screen on the remote control device 1 or on the mechanism 2.

The remote control device 1 can be used to control a computer, for example for internet navigation, or to carry out browser games. The remote control device 1 may be a component of a system environment for using augmented reality. For this purpose, the remote control device 1 is linked to a system control environment by a corresponding interface. An internet page can react by HTML/JavaScript or browser plugins, for example Java, to 3D control inputs, such as position, mean speed or rate of rotation and acceleration, and to rigidly defined gestures. For this purpose, HTML, JavaScript or the browser plugins are extended by gesture elements in addition to the already existing speech elements for input by a mouse and keyboard.

An image volume that can be detected by the camera module 4 can be divided by the feedback module 27 and/or by the input module 31 into various volume zones, for example into an off-zone, into a pre-zone, into a move-zone, into a click-zone or into a post-zone.

The off-zone describes a region, for example, in front of an input plane of an input aid installed by the input module 31 in the form of a keyboard. All the detected movement values or distance values in the off-zone are automatically ignored by the remote control device 1. The off-zone may be the region which is furthest away from the input plane, which may be defined by the input module 31.

The pre-zone borders the off-zone. Detected movement values and/or distance values can be collected here in volume sections, which adjoin one another as cubes in the manner of a depth-staggered chessboard. From the distribution of an accumulation of movement values or distance values, patterns can be calculated with the image evaluation module 8, which are overlaid as "shadows" becoming darker over the installed monitor image, to orient the position of parts of the object 3, in other words, for example, body parts.

The move-zone borders the pre-zone. The moving objects locally coming closest to the input plane, for example the outstretched finger of the user, are characterized as a pointer varying in its characteristics in the input plane, for example as a circle which becomes smaller with a decreasing distance from the input plane, with an arrow located in the centre point. The pointer is moved in this zone without triggering a function. The size of the circle is used for feedback and therefore for monitoring the body parts carrying out the gestures by the user.

The click-zone borders the move-zone. It is located in the region of the virtual input plane. The circle that has become smaller, on entering the click-zone, can, for example, become a star with an accompanying click-noise in order to display the triggering of a control command.

By varying movement parameters, different control commands can be triggered, which are, for example, comparable with the various menu commands of a program menu. If the click-zone is reached and left again after a predetermined short time span, only a predetermined short path being covered, in addition, in the input plane by the moved part of the object 3, a corresponding control command is triggered and confirmed with a click-noise. If the input plane is remained in for a relatively long time, a different control command can be triggered, which can also be combined with a monitoring of the move-zone.

If a plurality of body parts carrying out the gestures are detected in the input plane, the detected combinations of the movements of these body parts can trigger further control commands, for example a zooming, a rotation of an object shown or a vertical or horizontal scrolling.

The post-zone is located behind the click-zone, in other words remote from the move-zone. This post-zone can be detected to trigger further control commands by the corresponding evaluation by the image evaluation module 8. For example, a distinction can be made between horizontal and vertical scrolling.

The zone staggering described above is defined proceeding from the camera module 4. If the camera module 4 is not arranged opposing the user, but is arranged on the user side and is carried by him, corresponding zone staggering is produced.

Figure 2:
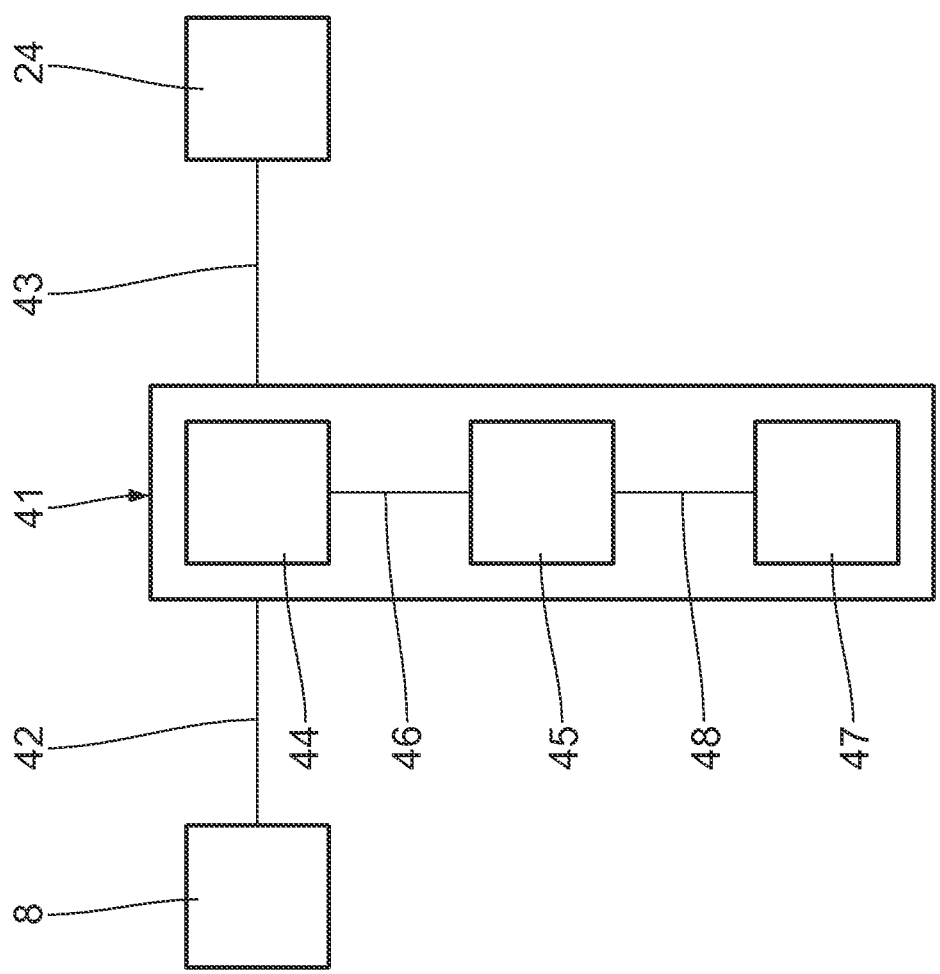
FIG. 2 shows an interface module for communication between modules of a remote control device according to FIG. 1 or between at least one of the modules of the remote control device according to FIG. 1 and an external mechanism.

FIG. 2 shows an interface module 41 for communication between the various modules of the remote control device 1, for example for communication between the image evaluation module 8 and the control and communication module 24 or between the control and communication module 24 and the feedback module 27, or at least between one of the modules of the remote control device 1 and an external device, for example the mechanism 2. Components, which correspond to those, which have already been described above with reference to FIG. 1, have the same reference numerals and will not be discussed again in detail. The interface module for communication between the image evaluation module 8 and the control and communication module 24 is shown in FIG. 2. The mechanism 2 to be controlled can also take the place of the image evaluation module 8. The interface module 41 may, for example, be used instead of the interface 26 of the remote control device 1.

The interface module 41 communicates by means of a signal connection 42 with the image evaluation module 8 and by means of a signal connection 43 with the control and communication module 24.

The interface module 41 has a data memory 44. Movement parameter sets of assigned movement values and/or distance values are stored therein. Control signals assigned to these sets are also stored in the data memory 44. The assignment of the sets and the control signals takes place by storing them in a table.

The interface module 41 furthermore has a comparator sub-module 45. The latter communicates with the data memory 44 by means of a signal connection 46. Actual movement parameters, which are fed to the interface module 41 by means of the signal connection 42, are compared with desired movement parameters from the data memory 44 in the comparator sub-module 45.

The interface module 41 furthermore has a communication sub-module 47. This communicates with the comparator sub-module 45 by means of a signal connection 48. The communication sub-module 47, with adequate agreement between the actual movement parameter and one of the desired movement parameters, sends the control signal assigned in the data memory 44 by means of the signal connection 43 to the control and communication module 24 of the remote control device 1 or to the mechanism 2 to be controlled.

The interface module 41 can be integrated in the software environment of a browser. The comparator sub-module 45 may carry out a statistical evaluation, as has already been described above in connection with the remote control device 1 according to FIG. 1.

The interface module 41 can be universally used with a standardized movement parameter set and allows a gesture communication with various pieces of terminal equipment.

What is claimed is:

1. A remote control device for controlling a mechanism to be controlled with the aid of at least one of a movement pattern and a distance pattern of at least one moved object, comprising:
    a camera module to receive a stereo image and to detect the moved object;
    an image evaluation module, which has a signal connection to the camera module, the image evaluation module comprising:
        a movement evaluation sub-module, which determines movement values with respect to the detected object from detected camera signal data; and
        a distance evaluation sub-module, which determines distance values with respect to the detected object from the detected camera signal data,
    a control and communication module, which has a signal connection to the image evaluation module and, at least one of depending on the determined movement values and depending on the determined distance values, generates at least one mechanism control signal and sends it to the mechanism to be controlled,
    a raw signature memory module, in which movement parameter sets of at least one of assigned movement values and distance values and control signals assigned to these sets are stored in a table, and
    a comparator module, in which actual movement parameters, which are detected with the camera module and the image evaluation module, are compared with desired movement parameters from the stored raw signature memory module,
    wherein the control and communication module, with adequate agreement between the actual movement parameter and one of the desired movement parameters, sends the assigned control signal to the mechanism to be controlled; and
    wherein the image evaluation module performs a characterization of movement or distance patterns by a temporal accumulation of given movement, speed or distance values of point clouds detected by the camera module.

2. A remote control device according to claim 1, comprising a camera module with at least three cameras.

3. A remote control device according to claim 1, wherein the image evaluation module has a brightness evaluation sub-module, which determines at least one of contrast values and color values with respect to the detected object from the detected camera signal data.

4. A remote control device according to claim 1, wherein the image evaluation module has a detail preselection sub-module, which, from detected raw camera signal data, selects and preselects an image detail of an image region, which can be detected as a whole by the camera module, the camera signal data of which are subjected to a further evaluation.

5. A remote control device according to claim 1, wherein the image evaluation module has an image error evaluation sub-module, which, from the detected camera signal data, determines imaging errors.

6. A remote control device according to claim 1, wherein the image evaluation module has a texture evaluation sub-module, which determines textures from the detected camera signal data.

7. A remote control device according to claim 1, wherein the image evaluation module has an activation evaluation sub-module with a data memory, which, from the detected camera signal data, determines an object signature and compares the determined object signature with an activation signature stored in the data memory, wherein, with adequate agreement of the determined object signature with the activation signature, an activation signal is sent to the control and communication module to activate the mechanism to be controlled.

8. A remote control device according to claim 1, comprising a feedback module, which has a signal connection to the control and communication module to display a feedback signal at least one of the mechanism to be controlled and the moved object to the remote control device.

9. A remote control device according to claim 1, comprising a camera activation module, which has a signal connection to the camera module and the control and communication module, the control and communication module, depending on at least one of the determined movement values and the determined distance values, generating at least one camera control signal and sending the generated at least one camera control signal to the camera module.

10. A remote control device according to claim 1, comprising an input module, which can be actuated with the aid of at least one of the movement pattern and the distance pattern of the moved object and has a signal connection to the control and communication module to input mechanism control signals by a movement of the object.

11. A remote control device according to claim 1, comprising an illumination module to illuminate a detection region, in which the moved object is detected by the camera module.

12. A remote control device according to claim 11, wherein the illumination module has a light source with a plurality of emitted colors.

13. An interface module for communication one of between the modules of a remote control device and between at least one of the modules of the remote control device and an external mechanism, the remote control device being configured and operable to control a mechanism to be controlled with the aid of at least one of a movement pattern and a distance pattern of at least one moved object, the remote control device comprising:
- a camera module to receive a stereo image and to detect the moved object;
- an image evaluation module, which has a signal connection to the camera module, the image evaluation module comprising:
- a movement evaluation sub-module, which determines movement values with respect to the detected object from detected camera signal data; and
- a distance evaluation sub-module, which determines distance values with respect to the detected object from the detected camera signal data,
- a control and communication module, which has a signal connection to the image evaluation module and, at least one of depending on the determined movement values and depending on the determined distance values, generates at least one mechanism control signal and sends it to the mechanism to be controlled,
wherein the image evaluation module performs a characterization of movement or distance patterns by a temporal accumulation of given movement, speed or distance values of point clouds detected by the camera module, the interface module comprising:
- a data memory, in which movement parameter sets of at least one of assigned movement values and distance values and control signals assigned to these sets are stored in a table,
- a comparator sub-module, in which actual movement parameters, which are fed to the interface module, are compared with desired movement parameters from the movement parameter sets stored in the data memory, and
- a communication sub-module, which, with adequate agreement between the respective actual movement parameter and one of the desired movement parameters sends the control signal assigned in the table to one of the module of the remote control device and to the external mechanism.

14. A remote control device according to claim 1, wherein the movement values include speed values and acceleration values.

* * * * *